United States Patent [19]
Okita et al.

[11] Patent Number: 5,224,446
[45] Date of Patent: Jul. 6, 1993

[54] CONTROL APPARATUS FOR A ROTARY BODY FOR COOLING AN ENGINE

[75] Inventors: Reiji Okita, Higashihiroshima; Noriyuki Kurio, Hiroshima, both of Japan

[73] Assignee: Mazda Motor Corporation, Hiroshima, Japan

[21] Appl. No.: 884,591

[22] Filed: May 18, 1992

[30] Foreign Application Priority Data

| May 16, 1991 | [JP] | Japan | 3-111634 |
| May 16, 1991 | [JP] | Japan | 3-111635 |
| May 16, 1991 | [JP] | Japan | 3-111636 |
| May 16, 1991 | [JP] | Japan | 3-111637 |

[51] Int. Cl.$^5$ ............................... F01P 7/02
[52] U.S. Cl. ................... 123/41.12; 123/41.49
[58] Field of Search ................. 123/41.12, 41.49

[56] References Cited
U.S. PATENT DOCUMENTS
4,214,652 7/1980 Quenneville ................ 123/41.12

FOREIGN PATENT DOCUMENTS
55-108218 4/1980 Japan .

Primary Examiner—Noah P. Kamen
Attorney, Agent, or Firm—Keck, Mahin & Cate

[57] ABSTRACT

A speed control system for an engine cooling fan has a planetary gearset, variably establishing a ratio between input and output speeds, and a hydraulic controller for changing the speed ratio according to engine operating conditions. Either one of a sun gear and pinion gear constitutes an input gear connected to an engine output of the engine. The other one of the sun gear and pinion gear is operationally coupled to a hydraulic control and a ring gear constitutes an output gear driving a rotary body. The hydraulic controller applies and varies an operational resistance to the planetary gearset according to engine operating conditions so as to cause it to vary the ratio of input and output speeds.

42 Claims, 12 Drawing Sheets

CONTROL APPARATUS FOR A ROTARY BODY FOR COOLING AN ENGINE

BACKGROUND OF THE INVENTION

1. Field of the Invention

This invention relates to a control apparatus for a rotary body, such as a cooling fan or the like, for cooling an engine.

2. Description of Related Art

Generally, to speed up cooling action of a radiator, an engine or electrically driven fan or fans are used to draw air through the radiator core and blow it to an automobile engine. Since an engine driven fan can easily cause a great deal of air to move, it is widely used for large displacement automobile engines.

For such an engine driven fan, it is essential to reduce the loss of engine output efficiency, which accompanies driving and stopping the fan according to various cooling demands for the engine. The loss of engine output efficiency should be as small as possible. Additionally, in order for the engine driven fan to operate with the most cooling efficiency, it is necessary to control the speed of rotation of the fan according not to the speed of rotation of the engine but to certain operating conditions. Such operating conditions may include cooling demands of the engine when no change in cooling demand of the engine is needed although the speed of the engine has changed, a need for a change in cooling demand of the engine although the engine does not change its speed, and a change in the cooling demand for the engine and a concurrent change in the speed of the engine without any correlation therebetween.

A fan speed control system meeting the above-mentioned requirements has been proposed. In such a system, fan speed is controlled in accordance with engine operating conditions, for instance cooling demands of the engine. The fan speed control system has a speed variable means, such as a planetary gear means, through which an engine driven fan is operationally connected to an engine crankshaft so as to enable the engine driven fan to vary in speed and an electromagnetic clutch installed in a carrier element of pinion gears of the planetary gear means which functions to control the speed ratio between the engine crankshaft and the fan. The electromagnetic clutch is, on one hand, locked and unlocked so as to drive and stop the fan and, on the other hand, changes slippage even in a locked condition according to control current supplied thereto. Such a fan speed control system is known from, for instance, Japanese Unexamined Utility Model Publication No. 55-108,218.

Although a fan speed control system, in which fan speed control is performed by a combination of a planetary gear means and an electromagnetic clutch, can perform starting and stopping of the fan with certainty it is not considered practical to control, and particularly linearly control, the speed ratio between the engine crankshaft and the fan, by controlling current supplied to the electromagnetic clutch. This is because linearly controlling the speed ratio between the engine crankshaft and the fan requires advanced techniques due to the complexity in structure and function of the electromagnetic clutch.

In addition, because rotation resistance is simply added to the carrier element of the pinion gear of the planetary gear means by the electromagnetic clutch, and since the speed ratio between the engine crankshaft and the fan, provided by the planetary gear means, is a minimum when the carrier element stops, the planetary gear means can not provide any speed ratio less than the minimum speed ratio due to its structure. Therefore, because a maximum rotation speed of the fan is definitely determined by a speed of the engine and a gear ratio of the planetary gear means, it is difficult to certainly obtain higher speeds of the fan at low engine speeds, in other words, to certainly provide the most suitable speeds of the fan in response to changes in cooling demand of the engine. This difficulty causes the fan speed control system using a planetary gear means to remain unsatisfactory in terms of improvement in cooling performance of the engine.

In the fan speed control system, if the planetary gear means for variably controlling a speed ratio malfunctions, the fan will not reach a speed sufficient to cool the engine depending upon a cooling demand of the engine. This causes overheating of the engine in some cases. For this reason, there is a requirement that the fan speed control system be equipped with a measure to secure desired fan speeds even during such a malfunction of the variable speed ratio control means, such as the planetary gear means, of the fan. However, there has not yet been found any effective technique to satisfy this requirement.

There is also a requirement for the variable speed ratio control means, such as the planetary gear means, of the fan to be properly lubricated for durability and reliability owing to its working efficiency or operation time, which is very high or long. However, no effective lubricating means has so far been proposed.

SUMMARY OF THE INVENTION

It is an object of the present invention to provide a rotary speed control system for an engine driven rotary body, such as an engine cooling rotary fan, in which the rotary body is certainly controlled in speed according to engine operating conditions with a decrease in engine output loss.

It is another object of the present invention to provide a rotary speed control system for an engine driven rotary body, such as an engine cooling rotary fan, which can control the speed of the rotary body easily throughout a wide range of fan speeds.

The foregoing objects of the present invention are accomplished by providing a novel rotary speed control system for an engine driven rotary body, such as an engine cooling rotary fan, for blowing air to an engine so as to cool the engine. The speed control system has a rotary gear means, such as a planetary gear having a sun gear, a pinion gear and a ring gear, and a hydraulic control means. Either the sun gear or the pinion gear constitutes an input gear connected to an engine output of the engine. The other of the sun gear and pinion gear is operationally coupled to the hydraulic control means, and the ring gear constitutes an output gear driving the rotary body. The rotary gear means variably establishes a ratio of rotational speeds between the input gear and the output gear. The hydraulic control means applies and varies an operational resistance to the rotary gear means according to engine operating conditions so as to cause it to vary the ratio of rotational speeds.

BRIEF DESCRIPTION OF THE DRAWINGS

The above and other objects and features of the present invention will be apparent to those skilled in the art from the following description of preferred embodiments thereof when considered in conjunction with the appended drawings, wherein the same reference numerals have been used to designate the same or similar elements throughout the drawings, and in which.

DETAILED DESCRIPTION OF PREFERRED EMBODIMENTS

Because engine cooling systems are well known, the present description will be directed in particular to elements forming parts of, or cooperating directly with, an apparatus in accordance with the present invention. It is to be understood that parts which are not specifically shown or described and parts which are purely of conventional construction can take various forms well known to those skilled in the automobile art.

Figure 1:
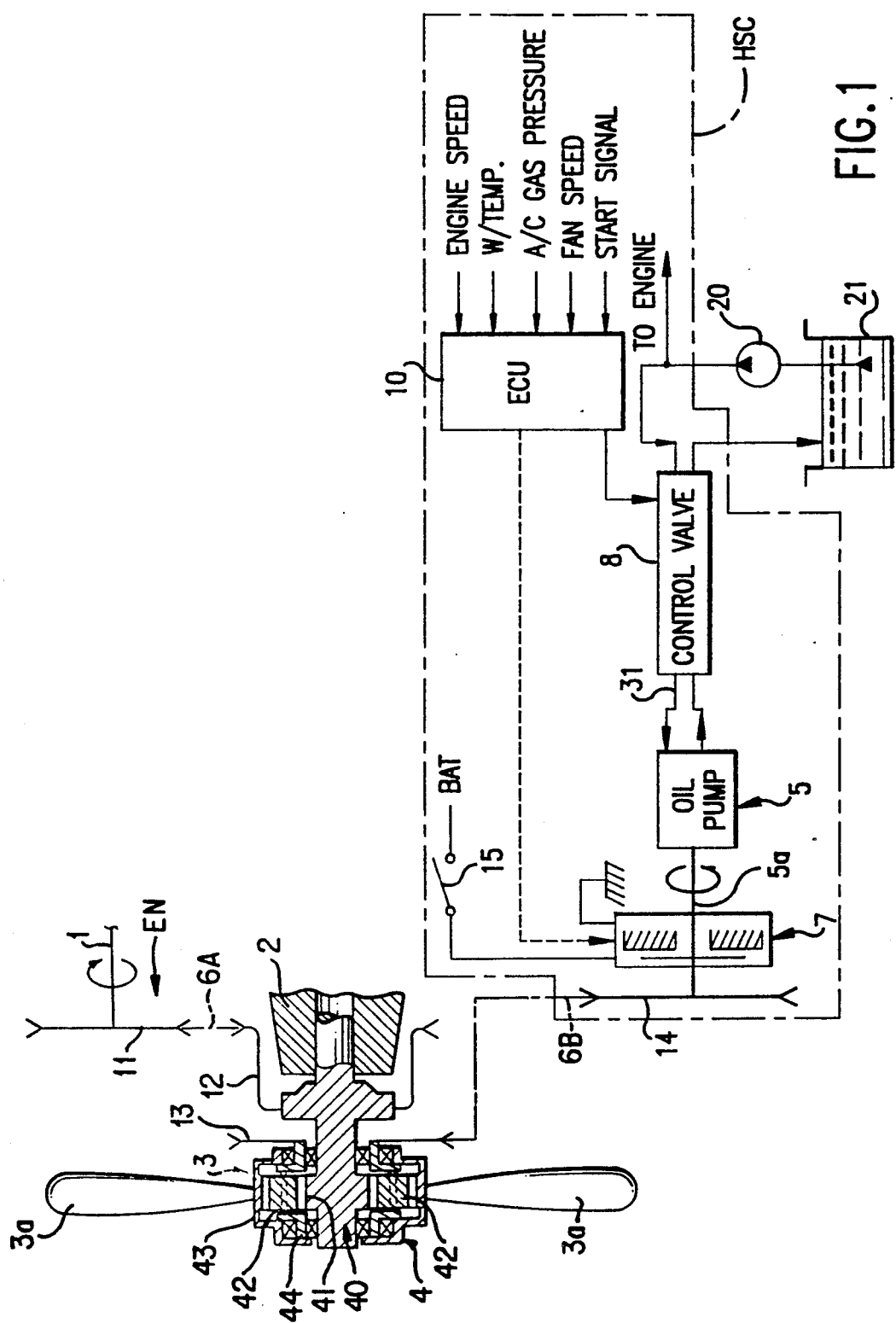
FIG. 1 is a schematic illustration of a fan speed control system for an engine cooling rotary fan in accordance with a preferred embodiment of the present invention.

Referring to FIG. 1 in detail, a fan speed control system for a fan used for drawing air through a radiator core and blowing it to an automobile engine so as to cool the engine according to a preferred embodiment of the present invention is shown. An engine, which is generally indicated by a reference EN, has a crankshaft 1. A crank pulley 11 is fastened to an end of the crankshaft 1. The engine EN is integrally provided at its front end with a bearing mount 2 for rotatively mounting a rotary shaft 40 of a rotary body, such as a fan 3, on the engine EN in a cantilevered manner. Specifically, the fan 3, having a plurality of fan blades 3a, is fastened to the rotary shaft 40 through a speed ratio variable gear means, such as an internal gear type of planetary gear assembly or mechanism 4 which is well known to those in the art.

Planetary gear mechanism 4 includes a sun gear 41 integral with an end of the cantilevered rotary shaft 40, a plurality of pinion gears 42 meshing with the sun gear 41 and connected all together by a carrier 44, and a ring gear 43 disposed so as to hold and mesh with all the pinion gears 42 from their outside. The rotary shaft 40 is fixedly provided with an input pulley 12 through which it is operationally coupled to the crank pulley 11 by a belt 6A so as to transmit the engine output to the planetary gear mechanism 4 through the sun gear 41, which is referred to as an input element of the speed ratio variable gear means. The engine output transmitted to the planetary gear mechanism 4 is output through the ring gear 43, serving as a fan drive element, to which the fan 3 is fixed. The planetary gear mechanism 4 is provided with an input pulley 13 attached to the carrier 44, and an oil pump 5 is provided with a counter pulley 14. These input pulley 13 and counter pulley 14 are operationally connected by a belt 6B. The pinion gears 42 are thus operationally coupled to the oil pump 5 serve as a speed ratio setting means.

Planetary gear mechanism 4 variably controls the speed ratio between the crank shaft 1 and the fan 3 by changing the speed of revolution of the pinion gears 42 around the sun gear 41. That is, as a rotation speed of the carrier 44 becomes low, namely, as a difference between rotation speeds of the carrier 44 and the sun gear 41 becomes large, the speed ratio between the engine crankshaft 1 and the fan 3 becomes low, so that the ring gear 43, and hence the fan 3, increases in rotation speed. When the revolution of the pinion gears 42 around the sun gear 41 stops, the speed ratio becomes a minimum. Therefore, changing and adjusting the rotation speed of the fan 3 is performed only by varying the rotation resistance of the carrier 44 so as to adjust the rotational speed of the carrier 44, thereby adjusting the revolution speed of each pinion gear 42. Based on this principle, the oil pump 5 of a hydraulic speed controller HSC is adapted to be increasingly and decreasingly adjustable in its drive resistance so as to adjust the rotational resistance of the pinion gear 42.

Hydraulic speed controller HSC includes the oil pump 5 having a rotary shaft 5a to which the counter pulley 14 is fastened. Between the oil pump 5 and the counter pulley 14 there is an electromagnetic clutch 7 mounted on the rotary shaft 5a. When the electromagnetic clutch 7 is deactivated or unlocked, the oil pump 5 is rotated by the engine crankshaft 1 through the planetary gear mechanism 4 via the input and counter pulleys 13 and 14. On the other hand, when the electromagnetic clutch 7 is activated or locked, the oil pump 5 is forced to suspend its rotation During the forcible suspension of rotation of the oil pump 5, the carrier 44, connected to the oil pump 5, is of course stopped, minimizing the speed ratio of the planetary gear mechanism 4, so that the fan 3 rotates at the maximum speed.

Electromagnetic clutch 7 is controlled to be locked and unlocked according to closing and opening operations of a thermoswitch 15 responding to temperatures of engine cooling water. Specifically, in this embodiment, the switch 15 opens at engine cooling water temperatures lower than a predetermined critical temperature, for instance approximately 115 degrees celsius, so as to shut off current to the electromagnetic clutch 7 and deactivate or unlock the electromagnetic clutch 7, thereby allowing the rotary shaft 5a of the oil pump 5 to rotate. On the other hand, the switch 15 closes at temperatures of engine cooling water equal to or higher than the critical temperature of approximately 115 degrees celsius so as to supply current to the electromagnetic clutch 7 and activate or lock the electromagnetic clutch 7, thereby prohibiting the rotary shaft 5a of the oil pump 5 from rotating.

An engine oil pump 20 supplies and circulates a pressurized lubricant oil to the oil pump 5 and delivers a major portion of the lubricant oil to the engine EN. The lubricant oil is circulated between the oil pump 5 and an oil tank 21 through an oil passage 31 with an electrically controlled control valve 8, such as a throttle valve. The control valve 8 is variable in resistance to the lubricant oil passing therethrough so as to increasingly and decreasingly vary the difference between pressures of the lubricant oil on inlet and outlet sides of the oil pump 5. When the control valve 8 is operated toward a closing side to increase its resistance to the lubricant oil, and hence the pressure difference between the inlet and outlet sides of the oil pump 5, the drive resistance of the oil pump 5 acting on the carrier 44 of the planetary gear mechanism 4 rises. Consequently, the carrier 44 changes decreasingly its rotational speed, and gradually increases the rotational speed of the fan 3. On the contrary, the control valve 8 is operated toward an opening side to drop its resistance to the lubricant oil, and hence the pressure difference between the inlet and outlet sides of the oil pump 5. The drive resistance of the oil pump 5 acting on the carrier 44 of the planetary gear mechanism 4 drops. Consequently, the carrier 44 changes increasingly its rotational speed, and gradually decreases rotational speed of the fan 3.

Control valve 8 is controlled on the basis of control signals output from a electronic control unit (ECU) 10, mainly comprising a microcomputer, in accordance with operating conditions of the engine, such as engine speed, engine cooling water temperature, and gas pressure of an air conditioner, so as to feedback control the fan 3 so that it reaches a desired or target fan speed which is retrieved from a map of target fan speeds according to the engine operating conditions. As an example, in an engine operating condition wherein the water temperature of the engine 10 is relatively high, even at a low engine speed, during, for instance, idling, because it is necessary to drive the fan 3 at a higher speed so as to promote cooling of the engine EN, a target rotational speed of the fan 3 for the engine operating condition is set relatively high. Accordingly, in such an engine operating condition, the control valve 8 is throttled so as to raise the drive resistance of the oil pump 5, thereby elevating the rotational speed of the fan 3. If the gas pressure of the air conditioner is high, the control valve 8 is throttled in the same way so as elevate the rotational speed of the fan 3.

On the other hand, in an engine operating condition wherein the engine operates at high speeds while engine cooling water temperature is not so high and the demand for cooling the engine by the fan 3 is rather low, rotating the fan 3 at a high speed, following the engine speed leads to undesirably increasing a loss of the engine output, which is not beneficial for acceleration performance or the like of the engine. Therefore, the target rotation speed of the fan 3 for such a engine operating condition is predetermined to be relatively low. Accordingly, the control valve 8 is operated so as to drop its resistance to the lubricant oil, thereby decreasing the drive resistance of the carrier 44 of the planetary gear mechanism 4 and dropping the speed of the fan 3.

Feedback controlling the rotational speed of the fan 3 in accordance with engine operating conditions ensures that the fan 3 rotates at a desired speed meeting an actual cooling demand for an on-going engine operating condition. Simultaneously, undesired loss of the engine output is prevented or made as small as possible. This results in ensuring both engine cooling efficiency and engine output efficiency, such as, for instance, acceleration efficiency of the engine.

Figure 2:
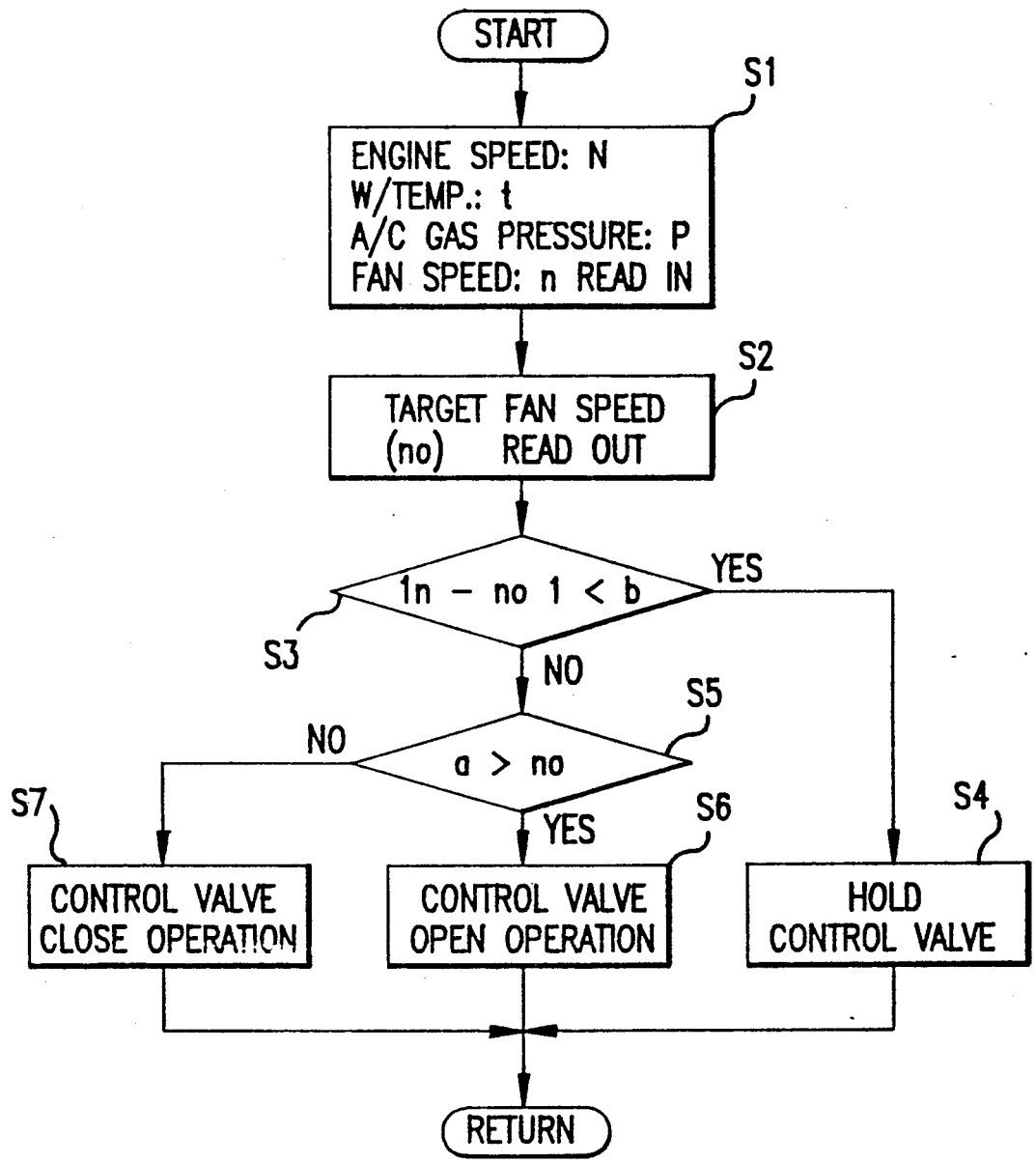
FIG. 2 is a flow chart showing a fan speed control sequence for a microcomputer of an electronic control unit.

The operation of the fan speed control system depicted in FIG. 1 is best understood by reviewing FIG. 2, which is a flow chart illustrating a fan speed control routine for the microcomputer of the electronic control unit (ECU) 10. Programming a computer is a skill well understood in the art. The following description is written to enable a programmer having ordinary skill in the art to prepare an appropriate program for the microcomputer. The particular details of any such program would of course depend upon the architecture of the particular computer selected.

Referring to FIG. 2, which is a flow chart illustrating the fan speed control routine, after reading a present engine operating condition represented by an engine speed N, an engine cooling water temperature t, an air conditioner (A/C) gas pressure P, and a fan speed n, at step S1, a target fan speed no for the engine speed N is read out from the target fan speed map at step S2. At step S3, the fan speed n and the target fan speed no are compared so as to decide whether a deviation between them is smaller than a predetermined specific value b. As long a the absolute value of the difference is smaller than the specific value b, it is judged that the fan 3 is operating at a desirable or normal fan speed. On the other hand, if the absolute value of the difference is larger than the specific value b, it is judged that the fan 3 is operating at an undesirable fan speed. If the answer to the decision at step S3 is "YES," this indicates that the fan 3 is operating at a desirable fan speed, then, the control valve 8 is held at its opening so as to keep the present rotation resistance acting on the carrier 44 at step S4, thereby causing the fan 3 to continue to operate at its present speed.

When the answer to the decision at step S3 is "NO," namely, when the deviation of speeds is greater than or equal to the specific value b, this indicates that increasing or decreasingly the fan speed n is needed. If in fact the speed n of the fan 3 does change, then, a final decision is made at step S5 as to whether that the fan speed n is greater than the target fan speed no. If the answer is "YES," or the fan speed n is greater than the target fan speed no, the control valve is operated toward its open side so as to reduce or lower the rotational resistance of the oil pump 5 acting on the carrier 44 at step S6, thereby causing the fan 3 to drop its speed. On the other hand, if the answer is "NO," or the fan speed n is equal to or lower than the target fan speed no, the control valve 8 is operated toward its close side so as to increase or raised the rotational resistance of the oil pump 5 acting on the carrier 44 at step S7, thereby causing the fan 3 to elevate its speed.

This sequence is repeatedly executed, so that the fan 3 operates at desired speeds in accordance with engine cooling demands with engine output loss suppressed so as to be as small as possible.

As long as the fan speed control is performed normally, there is no problem in the cooling performance of the engine cooling system. However, if the fan speed control system malfunctions for some reason, which results in unsuitable fan speed control, the engine may possibly be subjected to a rise in temperature in excess of that which adversely affects engine protection. However, even in case of a malfunction of the fan speed control system, the electromagnetic clutch 7 is locked when the water temperature switch 15 closes at the critical temperature of engine cooling water, which is approximately 115 degrees in celsius in this embodiment. As a result, the oil pump 5, and hence the carrier 44 of the planetary gear mechanism 4, stops, minimizing the speed ratio of the planetary gear mechanism 4, so as to cause the fan 3 to operate at the maximum speed. This maintains the temperature of the engine below the critical temperature of approximately 115 degrees celsius and helps the engine to drop its temperature in a short period of time. In other words, upon a malfunction of the fan speed control system, the fan 3 is compulsively operated so as to bring the engine into a safe condition of operation. Overheating of the engine, which is one of the worst conditions of an engine, is avoided, therefore.

The fan speed control system depicted in FIG. 1 may execute a control sequence more precisely by taking the temperature of engine cooling water and an elapse of time after an engine start into account. In a precise fan speed control, until a predetermined period of time after engine starting, in which the engine is still operating at a relatively high speed, has passed, the electromagnetic clutch 7 is unlocked for the purpose of releasing a rotational resistance of the oil pump 5 from the carrier 44 so a not to allow the fan 3 to operate. This is because, owing to a relatively high speed of the engine during the beginning of starting, the fan 3 rotates at a high speed following the high engine speed and, consequently, easily generates loud noises, if the oil pump 5 exerts its drive resistance on the carrier 44 of the planetary gear mechanism 4. In order to avoid the generation of such loud noises during the beginning of starting, the carrier 44 is disconnected and freed in operation from the oil pump 5 for the predetermined time period after engine ignition, holding the fan 3 inoperative so as to prevent the fan from increasing the level of noise. For this purpose, the electromagnetic clutch 7 is also controlled by a control signal from the electronic control unit (ECU) 10. Namely, the electronic control unit (ECU) 10 receives a starting signal representative of ignition of the engine. Upon receiving the starting signal, the electronic control unit (ECU) 10 keeps the electromagnetic clutch 7 deactivated or unlocked for a predetermined period of time. In addition, the temperature of engine cooling water is taken into account. That is, when the temperature of engine cooling water, which is representative of the temperature of engine, rises higher than a critical temperature, which is predetermined for each range of engine speeds and stored in a form of a map, the engine must be quickly cooled for engine protection. For this reason, as soon as the temperature of engine cooling water reaches the critical temperature, the fan 3 is forced to speed up to its maximum speed so as to cool the engine quickly.

Figure 3:
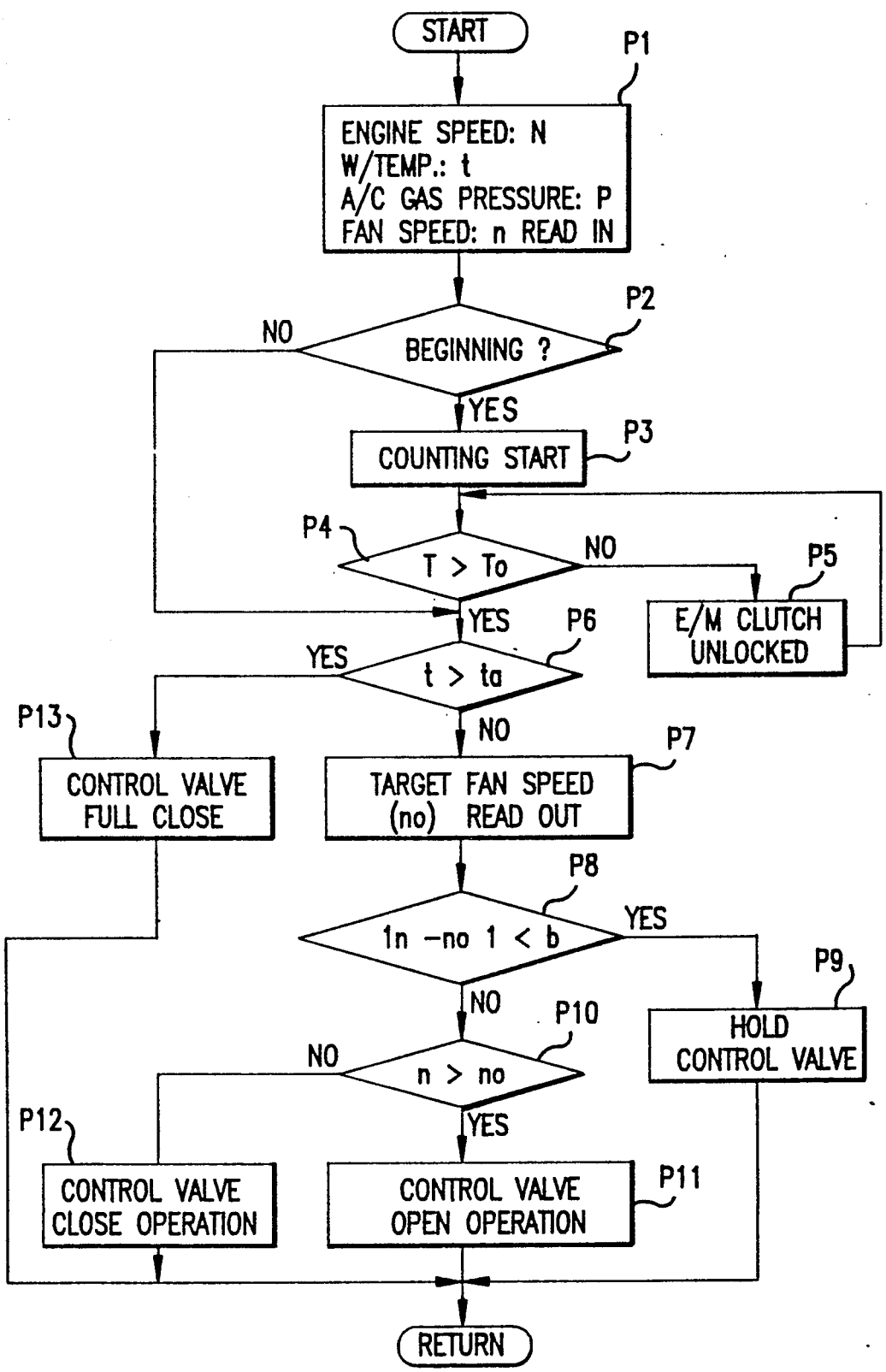
FIG. 3 is a flow chart showing a precise fan speed control sequence for the microcomputer of the electronic control unit.

Specifically, referring to FIG. 3, which is a flow chart illustrating a precise fan speed control routine for the microcomputer of the electronic control unit (ECU) 10, the first step is to read a present engine operating condition represented by an engine speed N, an engine cooling water temperature t, an air conditioner gas pressure and a fan speed at step P1. A decision is made based on an engine start signal at step P2 as to whether or not the engine is at the beginning of operation. If the answer to the decision is "YES", then, a timer is activated at step P3 to count a time T from the start of the engine. According to a counted time T of the timer, a decision is made at step P4 as to whether or not the counted time T is beyond the predetermined time period To, namely, whether or not the predetermined time period To has passed. If the answer to the decision is "NO", this indicates that the engine is still operating at a relatively high speed after engine starting. Then, the electromagnetic clutch 7 is unlocked at step P5 so as to release a rotational resistance of the oil pump 5 from the carrier 44. The steps P4 and P5 are repeated until the predetermined time period To has passed so as to maintain the electromagnetic clutch 7 unlocked for the predetermined time period To. Accordingly, in this engine starting period, the fan 3 does not rotate and, consequently, generates no fan noises at all.

If the answer to the decision at step P2 is "NO" or the answer to the decision at step P4 is "YES", this indicates that the engine is not at the beginning of operation and the predetermined time period (To) has passed after engine starting. Then, a decision is made at step P6 as to whether or note the temperature t of the engine cooling water is higher than an allowable water temperature ta, predetermined for the engine speed N and read out from the allowable water temperature map. When the water temperature t is lower than the allowable water temperature ta, namely, the answer to the decision at step P6 is "NO," steps P7 through P12 are executed. Because steps P7 through P12 are exactly the same as the steps S2 through S7 of FIG. 2, respectively, a description is unnecessary.

On the other hand, if the answer to the decision at step P6 is "YES," namely the water temperature t is higher than the allowable water temperature ta, this indicates that the water temperature t must be quickly lowered for engine protection. Then, the control valve 8 is fully closed down so as to raise the rotation resistance to a maximum and stop the carrier 44 at step P13, thereby causing the fan 3 to speed up to its maximum speed.

Figure 4:
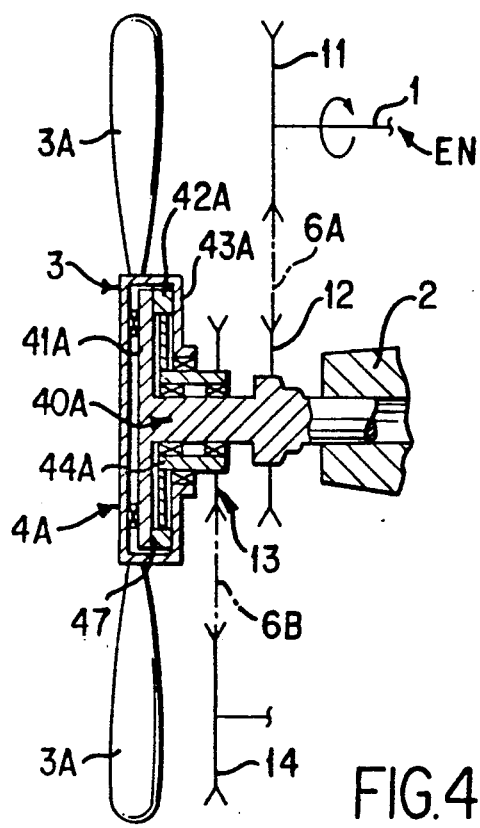
FIG. 4 is a schematic cross-sectional view of a drive mechanism for an engine cooling rotary fan.

Speed ratio variable gear means may be any well known type of planetary gear mechanism. For example, as shown in FIG. 4, the fan speed control system may simply replace the internal gear type of planetary gear mechanism 4 shown in FIG. 1 with a rack-and-pinion type of planetary gear mechanism 4A, Such a rack-and-pinion type of planetary gear mechanism 4A is well known in the art and includes a sun gear 41A secured to an external end of a rotary shaft 40A, a plurality of pinion gears 42A interconnected by a carrier 44A, and a ring gear 43A meshing with the pinion gears 42A. Installing the rack-and-pinion type of planetary gear mechanism 4A allows use of a rotary shaft of short length for the fan 3, resulting in an advantage of easily making the engine cooling control apparatus more compact.

Figure 5:
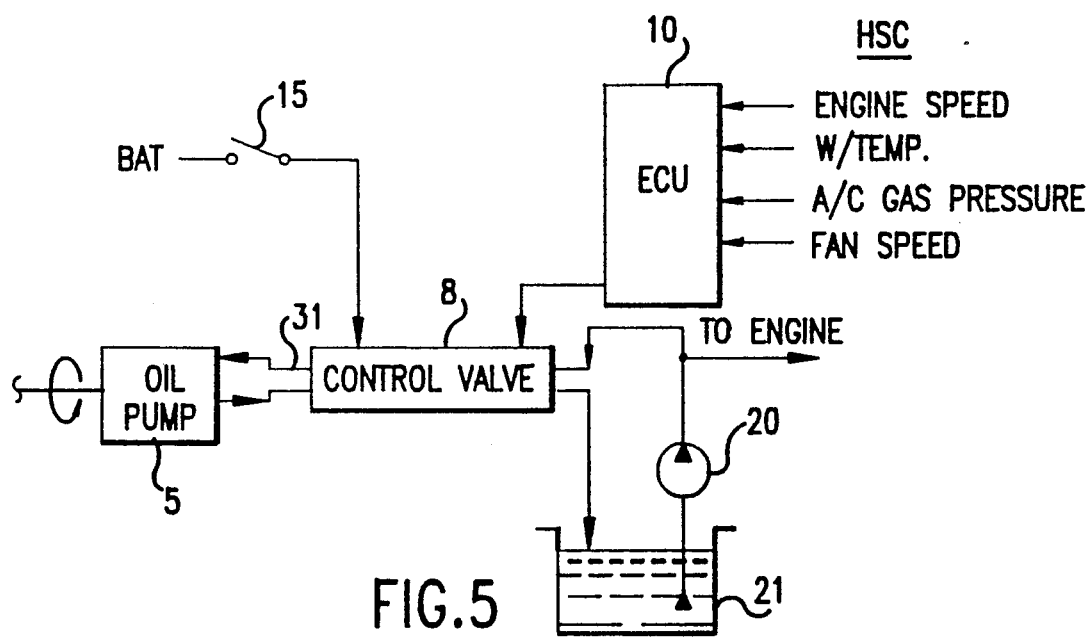
FIGS. 5 and 6 are block diagrams, respectively, showing variations of hydraulic speed controllers.

Providing the electromagnetic clutch 7 between the oil pump 5 and the speed ratio variable gear means, such as a planetary gear mechanism 4 or 4A, is not always essential. That is, as shown in FIG. 5, the thermostatic switch 15 is connected to the electrically controlled control valve 8 so as to force the control valve 8 to fully close when it closes at the critical temperature of approximately 115 degrees celsius. As was previously described, when the control valve 8 is fully closed, the oil pump 5 stops, so as to cause the fan 3 to speed up to its maximum speed.

Eliminating the electromagnetic clutch also results in an advantage of easily making the engine cooling control apparatus more compact.

Figure 6:
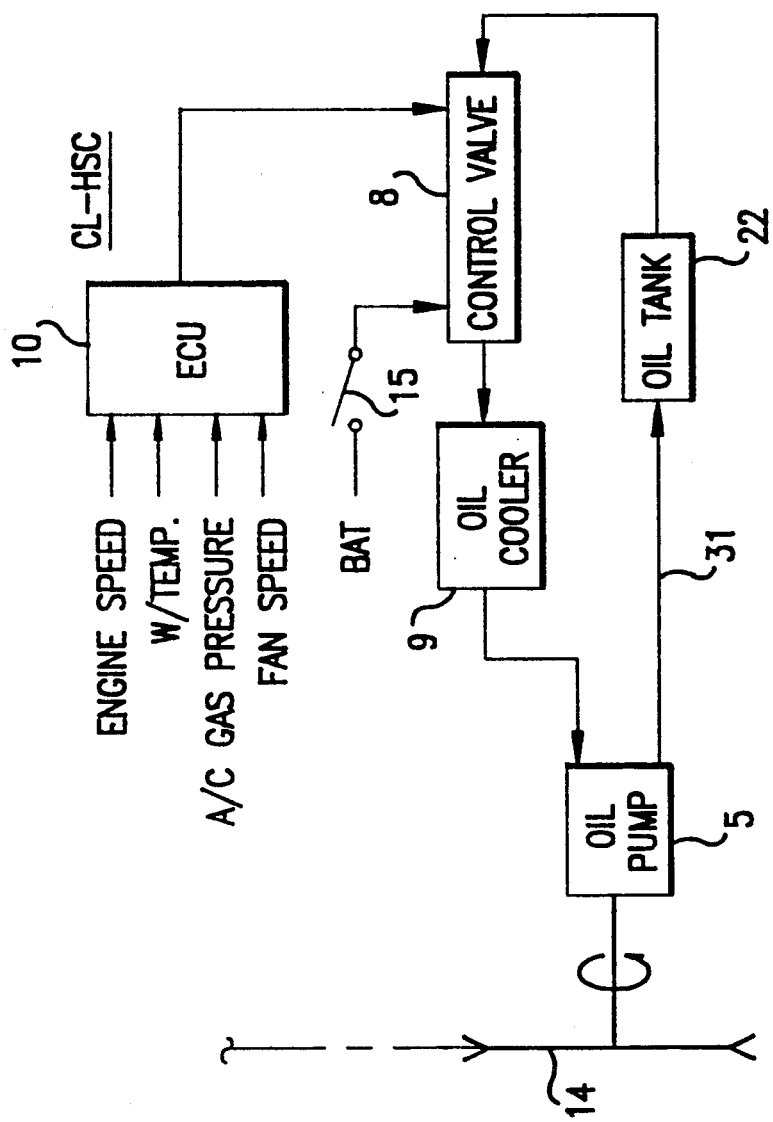

Referring to FIG. 6 a closed loop hydraulic speed controller CR-HSC is shown. The hydraulic speed controller HSC includes an oil pump 5, a control valve 8 and an oil cooler 9 which are connected to a oil tank 22 in a closed loop through an oil passage 31. Using such a closed loop hydraulic speed controller HSC including the oil cooler 9 prevents the hydraulic oil from increasing its temperature very high even for a long time operation. Consequently, the drive resistance of the oil pump 5 is precisely controlled at all times, so as to provide a high reliability of the fan speed control system.

Figure 7:
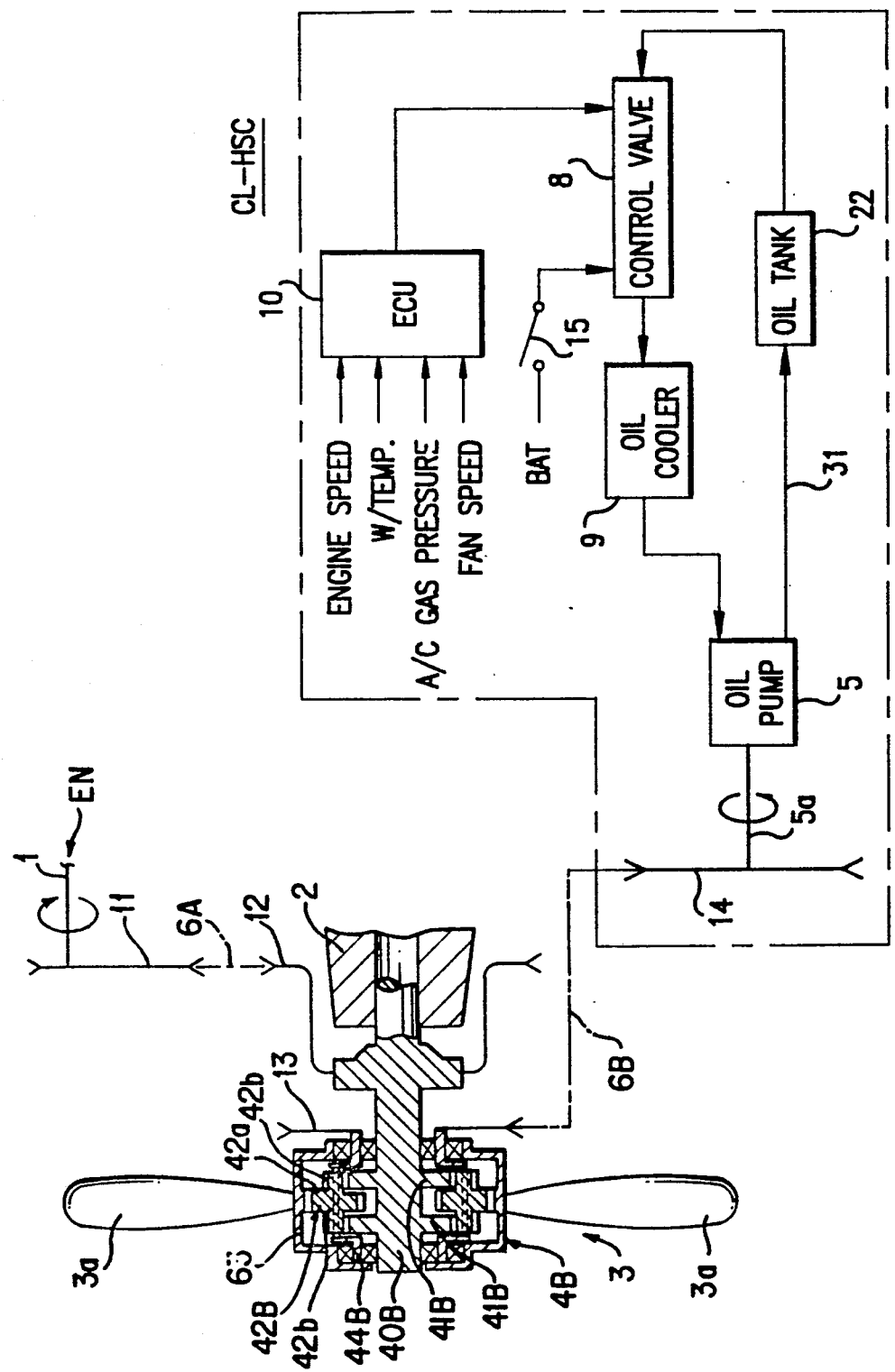
FIGS. 7 through 12 are schematic illustrations of fan speed control systems for an engine cooling rotary fan in accordance with other preferred embodiments of the present invention.

The closed loop hydraulic speed controller CR-HSC shown in FIG. 6 exhibits particular effects when used in combination with a specific planetary gear mechanism, shown in FIG. 7, which is an internal gear type. The planetary gear mechanism is structured in an attempt at obtaining a relatively high fan speed even for lower engine speeds. This attempt is achieved by setting a variable range of speed ratios between an input speed and an output speed of the planetary gear mechanism to lower speed ratios.

Referring to FIG. 7, a planetary gear mechanism 4B has a pair of sun gears 41B, which are integrally formed with, or otherwise secured to, a rotary shaft 40B, spaced apart in an axial direction of the rotary shaft 40B at a predetermined distance from each other. Each of a plurality pinion gears 42 comprises a large diameter gear 42a and a pair of small diameter gears 42b integrally formed with the large diameter gear 42a on opposite sides of the large diameter gear 42a. The large diameter gear 42a meshes with a ring gear 63; the small diameter gears 42b mesh with the sun gears 61, respectively.

Planetary gear mechanism 4B thus structured, varies its speed ratio between input and output speeds in such a way to reduce speed in a gear ratio between the sun gear 41 and the ring gear 43, and increase a gear ratio between the large diameter gear 42a and the small diameter gear 42b. Accordingly, the planetary gear mechanism 4B has a range of speed ratios lower than ranges of speed ratios in which the planetary gear mechanisms 4 and 4A, which reduces speed in a gear ratio only between the sun gear 41 and the ring gear 43. Therefore, even if, for example, the engine and the carrier 64 rotate at a same speed, the fan 3 installed in the planetary gear mechanism 4B can rotate at a speed which is higher, by a difference of the range of speed ratios from that of the planetary gear mechanism 4 or 4A, than the fan 3 installed in the planetary gear mechanism 4 or 4A. The fan speed control system having the planetary gear mechanism 4B is particularly suitable for engines which has a strong cooling demand while the engine itself operates at lower speeds, such as during idling.

Figure 8:
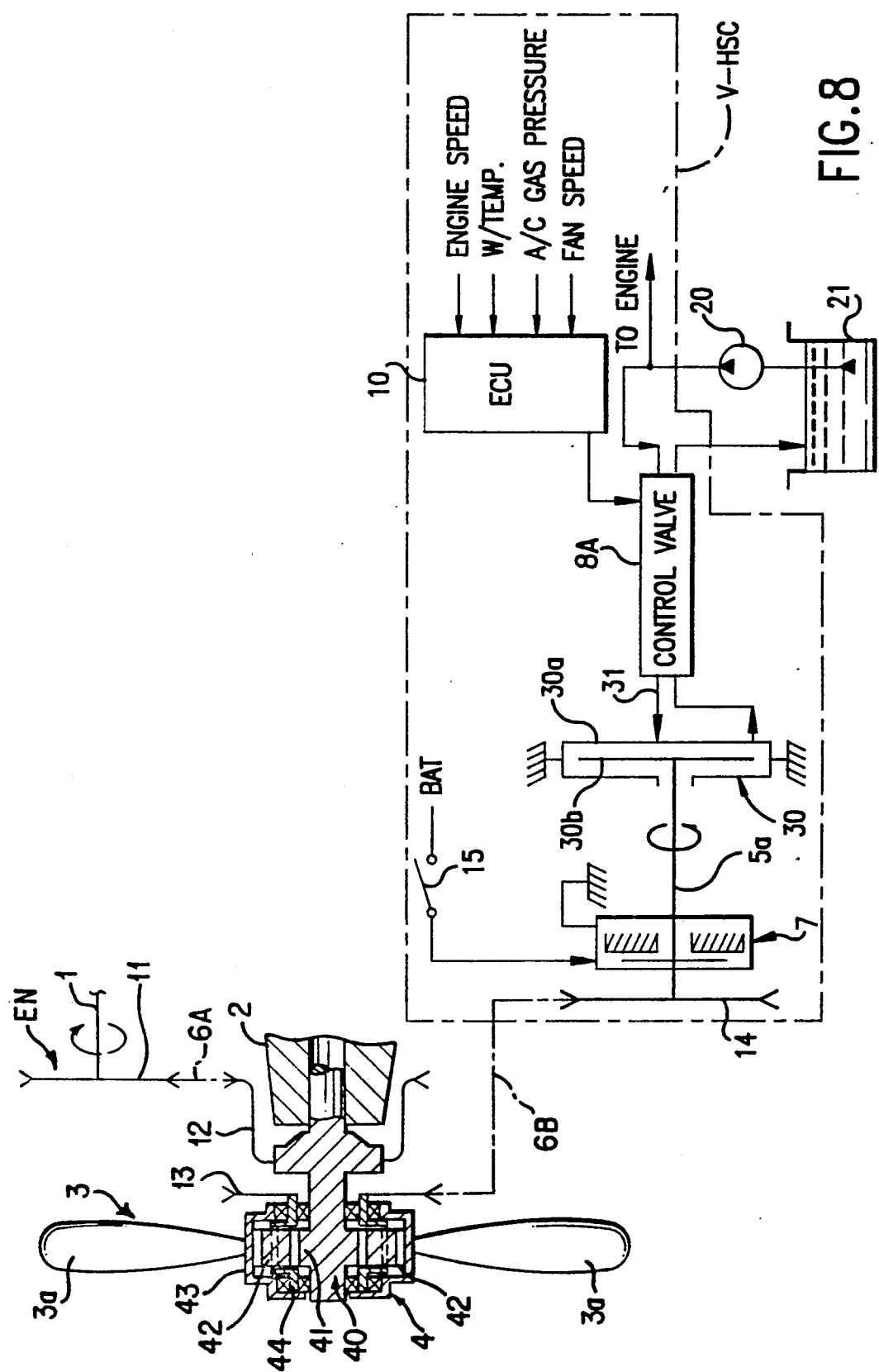

Referring to FIG. 8, a fan speed control system in accordance with another preferred embodiment of the present invention is shown, in which a viscous fluid coupling is used in a hydraulic speed controller. Because a planetary gear mechanism may be of any type in the previous embodiments, a description of the planetary gear mechanism is unnecessary.

A hydraulic speed controller V-HSC for varying the speed ratio of a planetary gear mechanism, such as the planetary gear mechanism 4 shown in FIG. 1, has a viscous fluid coupling 30 and a control valve 8A. As is well known in the art, the viscous fluid coupling 30 is formed by a circular casing 30a, which is fixed so as not to rotate, and a drive member or disc 30b fastened to a rotary shaft 5a, to which a counter pulley 14 is secured. The circular casing 30a receives the driving disc 30b therein so as to allow it to rotate. In order for the drive disk 30b to vary its drive resistance, the circular casing 30a is variably supplied with a viscous fluid through a control valve 8A. In other words, drive resistance of the drive disk 30b varies depending upon a change in quantity of the viscous fluid supplied or introduced into the circular casing 30a. Accordingly, the control valve 8A is adapted to vary the quantity of the viscous fluid passing therethrough.

Drive resistance of the drive disc 6b thus controlled acts on a carrier 44 of the planetary gear mechanism 4. Depending upon the drive resistance on the carrier 44, the planetary gear mechanism 4 varies its speed ratio. When causing the control valve 8A to vary the quantity of viscous fluid passing therethrough and supplied or introduced into the viscous fluid coupling 30 according to engine operating conditions, the carrier 44 of the planetary gear mechanism 4 changes its rotational resistance, so that the planetary gear mechanism 4 changes its speed ratio correspondingly. For a specific fan speed control, the sequences illustrated by the flow charts shown in FIGS. 2 and 3 may be applied to the control valve 8A.

For preventing an accidental rise in temperature of the engine, an electromagnetic clutch 7 and a thermoswitch 15 may be installed between the viscous fluid coupling 30 and the counter pulley 14 so as to operate in the same manner as described previously.

In the fan speed control system shown in FIG. 8 in which the viscous fluid coupling 30 is used, such an accidental rise in temperature is certainly prevented by simply draining the viscous fluid out from the viscous fluid coupling 30 so as to free the drive disc 30b from drive resistance and noises which the fan 3 generates in response to and during a quick increase in fan speed immediately after starting of the engine.

For the viscous fluid coupling 30, the hydraulic speed controller V-HSC may be replaced with a closed loop hydraulic speed controller CR-HSC such as that specifically shown in FIG. 6.

Figure 9:
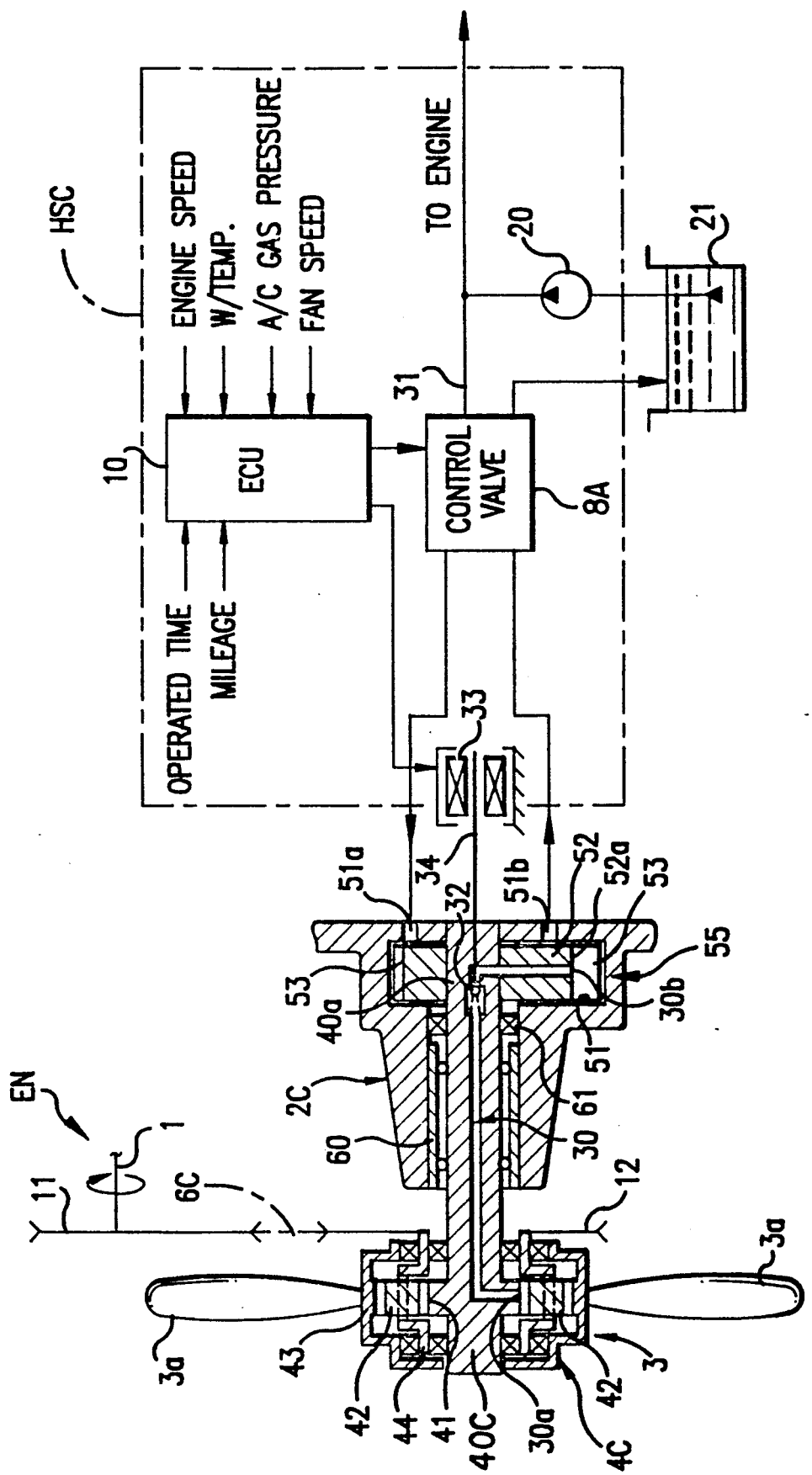

Referring to FIG. 9, a fan speed control system in accordance with another preferred embodiment of the present invention is shown, in which a part of a hydraulic speed controller, such as an oil pump, is built in a rotary shaft on which a planetary gear mechanism is mounted.

A bearing mount 2C, which is integrally formed with an engine at a front end, rotatively mounts a rotary shaft 40C in a cantilevered fashion through a bearing 60. A fan 3, having a plurality of fan blades 3a, is fastened to the rotary shaft 40C through an internal gear type of planetary gear assembly or mechanism 4. The planetary gear mechanism 4C includes a sun gear 41, a plurality of pinion gears 42 and a ring gear 43, all of which are the same in structure as those of the previously described internal gear type planetary gear assembly or mechanism. An input pulley 12, which is operationally coupled to a crank pulley 11 secured to an engine crankshaft 1 by a belt 6C, is attached to the carrier 44 so as to transmit the engine output to the planetary gear mechanism 4 through the pinion gears 42.

A built-in oil pump 55 is fixedly attached to one end of the rotary shaft 40C within the bearing mount 2C. The oil pump 55 has a rotor 52 which is provided with a plurality of vanes 53 installed therein so as to be able to protrude and retract. The rotor 52 is housed within an oil chamber 51 formed in the bearing mount 2C. The oil chamber 51 is sealed by a sealing ring 61 from the bearing 60. For controlling drive resistance of the oil pump 55 there is provided a hydraulic speed controller HSC which is the same in structure and operation as that shown in FIG. 1 so as to variably supply and circulate a pressurized engine oil into the oil chamber 51 through an oil passage 31 via inlet and outlet 51a and 51b. A control valve 8A of the hydraulic speed controller HSC is of a type capable of increasingly and decreasingly changing the pressure difference between a side of the inlet 51a and a side of the outlet 51b with respect to the built-in oil pump 55 so as to change the drive resistance of the built-in oil pump 55 according to the pressure differences.

Specifically, as the control valve 8 is almost fully closed, the pressure difference becomes smaller, so as to decrease the drive resistance acting on the oil pump 55. Hence the drive torque of the rotary shaft 40C becomes smaller correspondingly. Consequently, the sun gear 41 of the planetary gear mechanism 4C, which is integral with the rotary shaft 40C, is allowed to rotate as the carrier 44 rotates. As a result, the planetary gear mechanism 4C reaches its maximum speed ratio, slowing down the fan 3 or almost stopping the fan 3. On the contrary, as the control valve 8 is operated toward an opening side, the pressure difference is gradually increased, so as to increase the rotation resistance acting on the oil pump 55 correspondingly. As a result, the planetary gear mechanism 4C gradually changes its speed ratio so that it becomes smaller, and finally reaches its minimum speed ratio when the control valve is fully opened, stopping the oil pump 55, so as to speed up the fan 3 to its maximum speed. Such a control of the control valve 8 is performed by the electronic control unit (ECU) 10 so that the valve 8 opens and closes according to engine operating conditions in the same sequence as was previously described.

During operation of the engine, the planetary gear mechanism 4C directly receives engine torque and continuously operates at all times, so that it must be properly lubricated for durability and reliability. For this reason, the rotary shaft 40C is formed with an axially extending oil passage 30 along almost its whole length. In more detail, the oil passage 30 has an end portion 30a, extending radially in the sun gear 41 and open at an outer peripheral surface of the sun gear 41, and an end portion 30b, which extends radially in the rotor 52 of the built-in oil pump 55 and opens at an outer peripheral face 52a of the rotor 52 of the built-in oil pump 55. Through the oil passage 30, the oil in the oil chamber 51 is introduced into the planetary gear mechanism 4C and lubricates it.

Oil passage 30 may be provided with a check valve, such as a spring-forced or biased check valve 32, so as to control introduction of the oil into the planetary gear mechanism 4C in accordance with engine operating demands. The spring-forced check valve 32 is forced normally to close the oil passage 30 and is operated by means of an electric solenoid 33 with a plunger rod 34. When introduction of the lubrication oil into the planetary gear mechanism 4C is needed, the solenoid 33 is excited to open the spring-forced check valve 32 through the plunger rod 34, so as to permit introduction of the oil into the planetary gear mechanism 4C through the oil passage 30 for lubrication. On the other hand, when the solenoid 33 is not excited or deenergized, the spring-forced check valve 32 is closed and kept closed, so as to disconnect introduction of the oil into the planetary gear mechanism 4C through the oil passage 30, even while the engine is operating.

Solenoid 33 is controlled by the electronic control unit (ECU) 10 based on, for instance, operated time and mileage of the engine. Specifically, the solenoid 33 is excited for a predetermined period of time, for example, every predetermined operated time and/or after predetermined mileage so as to perform a periodic lubrication of the planetary gear mechanism 4C. Such a periodic lubrication of the planetary gear mechanism 4C prevents oversupplying the lubrication oil into the planetary gear mechanism 4C and, therefore, prevents the planetary gear mechanism 4C from being subjected to an undesirable increase in rotational resistance due to the oil viscosity. Accordingly, the fan speed control system allows desirable planetary gear lubrication and efficient engine output to be compatible.

Because the built-in oil pump 55 is directly mounted to one end of the rotary shaft 40C with which the sun gear 41 of the planetary gear mechanism 4C is integrally formed and is encased within the bearing mount 2C, the fan speed control system is made simple and compact as compared to, for example, the structure in which the sun gear and the oil pump are linked by a power transmission means such as a belt or the like. This makes it possible to provide a compact whole engine structure and a compact fan speed control system structure which are arranged and disposed in a limited space of an engine room.

Figure 10:
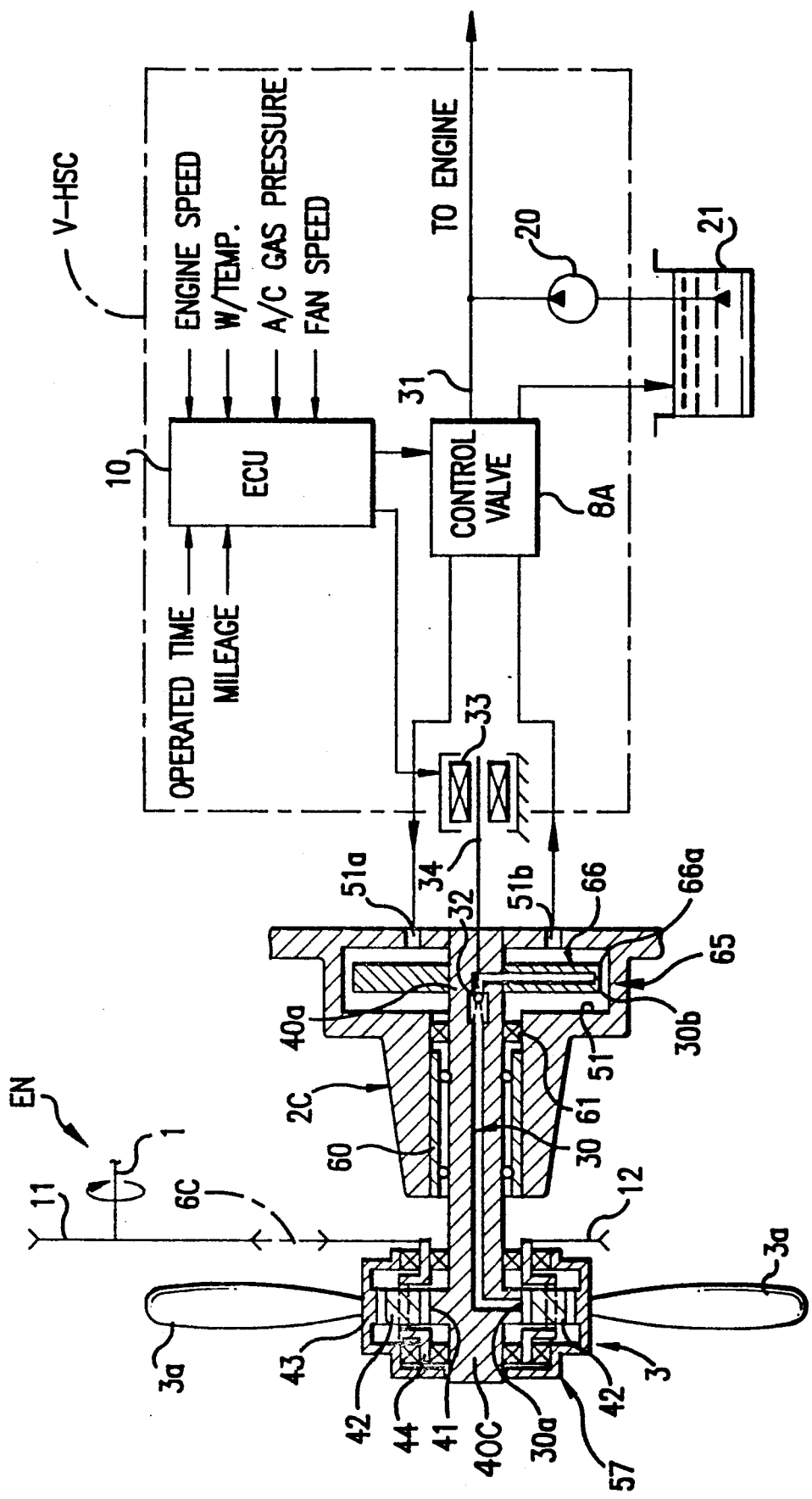

Referring to FIG. 10, a fan speed control system in accordance with still another preferred embodiment of the present invention is shown, in which in place of the built-in oil pump 55 of the previous embodiment shown in FIG. 9, a viscous fluid coupling is built in a rotary shaft on which a planetary gear mechanism is mounted.

A built-in viscous fluid coupling 65 is fixedly attached to one end of the rotary shaft 40C within a bearing mount 2C. The viscous fluid coupling 65 has a drive member or disc 66 fastened to a rotary shaft 40C. The drive disc 66 is housed within an oil chamber 51, having a predetermined volume, formed in the bearing mount 2C. The oil chamber 51 is sealed by a sealing ring 61 from the bearing 60.

An axially extending oil passage 30 is formed in the rotary shaft 40C along almost the whole length. The oil passage 30 has an end portion 30a, which extends radially in the sun gear 41 and opens at an outer peripheral surface of the sun gear 41, and an end portion 30b, which extends radially in the drive disk 66 of the viscous fluid coupling 65 and opens at an outer peripheral face 66a of the drive disk 66 of the viscous fluid coupling 65. Through the oil passage 30, the oil in the oil chamber 51 is introduced into the planetary gear mechanism 4C and lubricates it.

Oil passage 30 is provided with a spring-forced check valve 32, which is operated by a solenoid 33 controlled by an electronic control unit (ECU) 10 based on, for instance, operated time and mileage of the engine, so as to control introduction of the oil into the planetary gear mechanism 4C in accordance with engine operating demands in the same way as described in connection with the fan speed control system shown in FIG. 9.

Rotational resistance acting on the drive disc 66 of the viscous fluid coupling 65, and hence the sun gear 41 of the planetary gear mechanism 4C, which is integral with the rotary shaft 40C, varies depending upon the quantity of the oil introduced into oil chamber 51, so that the speed ratio of the planetary gear mechanism 4C varies correspondingly. Variably introducing the oil into the oil chamber 51 is performed by a control valve 8 of the fan speed controller V-HSC on the basis of a control signal from the electronic control unit (ECU) 10 according to engine operating conditions, as was previously described.

Figure 11:
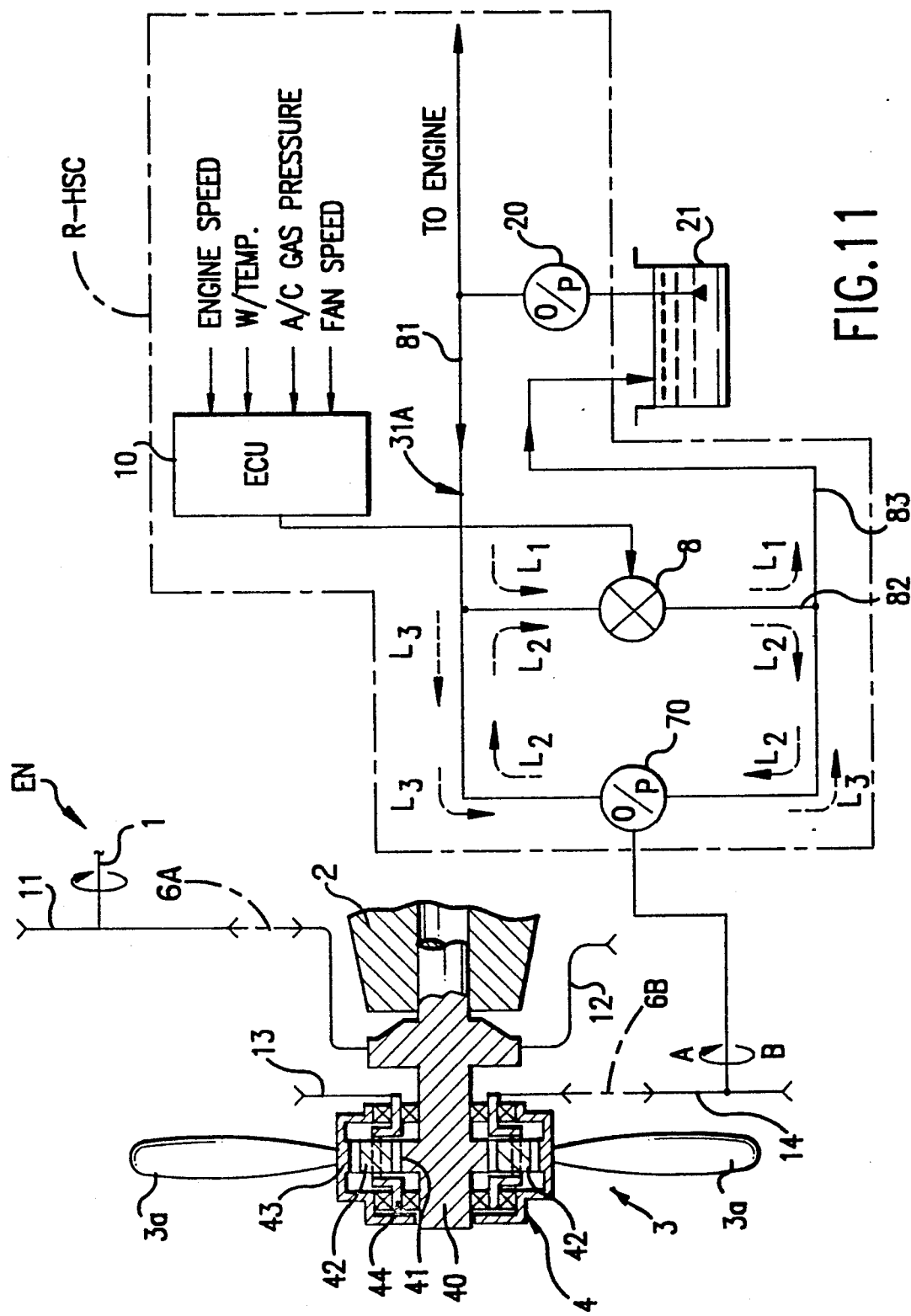

Referring to FIG. 11, a fan speed control system according to another preferred embodiment of the present invention is shown, in which a planetary gear mechanism makes its speed ratio smaller so at to cause a fan to operate at a higher speed. Increasing the speed ratio of a planetary gear mechanism is realized by increasing a rotational speed of pinion gears relative to a carrier. One way of increasing a relative rotational speed of pinion gears is to reverse the carrier in rotational direction with respect to the pinion gears. For this purpose, a hydraulic speed controller of the fan speed control system is adapted not only to change drive resistance of an oil pump but also to allow the oil pump to operate in opposite rotational directions.

Hydraulic speed controller R-HSC of the fan speed control system includes a reversible oil pump (O/P) 70 whose rotary shaft 5a is fastened to a counter pulley 14. To the reversible oil pump (O/P) 70, a pressurized oil is supplied by an engine oil pump 20 through a control valve 8, such as a throttle valve, disposed in an oil passage 31A. The oil passage 31A is formed by three passage portions, namely, an induction passage portion 81 through which the oil is supplied from an oil tank 21 to the reversible oil pump 70, a bypass passage portion 82 in which the control valve 8 is disposed and through which the oil bypasses the reversible oil pump 70 when the control valve 8 opens, and a return passage portion 83 through which the oil passed through the reversible oil pump 70 and the control valve 8 returns into the oil tank 21.

Control valve 8 is controlled by an electronic control unit (ECU) 10 to open and close according to engine operating conditions. Variably controlling a throttle opening of the control valve 8 changes the reversible oil pump 70 in rotational resistance and rotational direction both at once. That is, since, when the control valve 70 is almost fully opened, the bypass passage portion 82 provides the smallest passage resistance, the oil, introduced into the induction passage portion 81 by the engine oil pump 20, entirely flows through the bypass passage portion 82 as shown by arrows L1. Simultaneously, the oil in the induction passage portion 81 after the bypass passage portion 82 and in the return passage portion 83 before the bypass passage portion 82 circulates through the oil pump 70 as shown by arrows L2. Accordingly, as long as the control valve 70 is almost fully opened, the carrier 44 of the planetary gear mechanism 4, rotating in a direction in which it is followed by a rotation of the counter pulley 14 in a direction shown by an arrow A, which is referred to as a normal direction, never buffers from the rotational resistance of the oil pump 70. Consequently, the carrier 44 of the planetary gear mechanism 4 rotates following the sun gear 41. Thus, the planetary gear mechanism 4 provides its maximum speed ratio, so that the fan 3 is almost stopped.

As the control valve 8 is operated to its close side, the passage resistance of the bypass passage portion 82 is gradually increased, so that the oil, introduced into the induction passage portion 81 by the engine oil pump 20, flows through the induction passage portion 81 to the oil pump 70, i.e., in a direction of arrow L3 opposed to the direction of arrow L3 in which the oil had previously flown, with an gradual increase in quantity of oil. As a result, the oil pump 70 increases gradually its rotational resistance acting on the carrier 44, so as to reduce the rotation speed of the carrier 44 and, therefore, the speed ratio of the planetary gear mechanism 4. This causes a gradual increase in speed of the fan 3.

When the control valve 8 is further closed sufficiently to increase the rotational resistance of the oil pump 5 beyond the rotational force of the carrier 44, then, the carrier 44 is braked and forced to reverse in rotational direction by the oil pump 70. As a result, the planetary gear mechanism 4 increases its speed ratio higher, resulting in driving the fan 3 at an increased speed. When the control valve 8 is fully closed so as to cause the oil to entirely flow passing through the oil pump 70, the fan 3 reaches its maximum speed.

In the fan speed control system shown in FIG. 11, the fan 3 is readily and certainly controlled over a wide range of speeds simply by increasingly and decreasingly controlling the throttle opening of the control valve 8. Moreover, controlling the carrier 44 in opposite rotational directions expands or widens the range of speeds of the fan 3. This fan speed control system is more preferably used with, in particular, engines which have a strong demand for cooling even during its low speed operating conditions. In addition, since the fan speed control system provides desired fan speeds in accordance with a variety of engine operating conditions without being governed by engine speed, it eliminates loss of the engine output caused, for instance, due to a high speed operation of the fan 3 which is unnecessary for a required cooling demand. This also induces an advantage of improving acceleration performance of the engine and a suppressed increase in fan noise.

Figure 12:
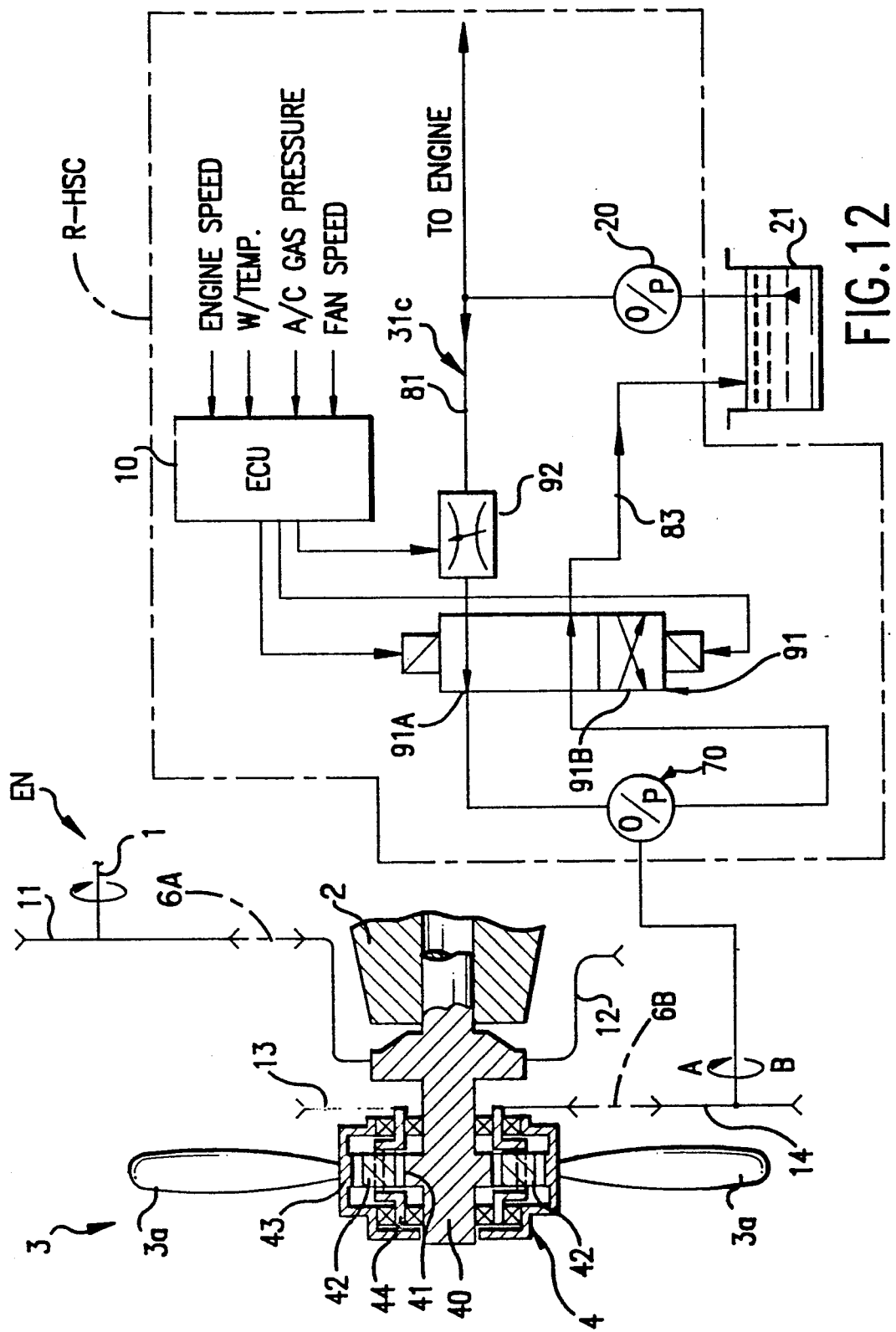

Referring to FIG. 12, a fan speed control system in accordance with another preferred embodiment of the present invention is shown, which is the same in structure and operation as the fan speed control system of the previous embodiment shown in FIG. 11, excepting a throttle valve and a directional control valve used in place of the control valve 8.

A directional control valve 91 is of a solenoid-operated, four port-two position type. The directional control valve 91 switches between two positions, namely, a first or normal valve position 91A wherein oil is introduced so as to cause an oil pump 70 to rotate in a normal direction shown by an arrow A, in which the carrier 44 of the planetary gear mechanism 4 rotates following the sun gear 41, and a second or reverse valve position 91B wherein oil is introduced so as to cause the oil pump 70 to rotate in the reversed direction shown by an arrow B. The directional control valve 91, which is controlled by the electronic control unit (ECU) 10 according to engine operating conditions, is disposed in an induction passage portion 81 and a return passage portion 83 of an oil passage 31c of a hydraulic speed controller TV-HSC.

A throttle valve 92, which is controlled by the electronic control unit (ECU) 10 according to engine operating conditions, is disposed in the induction passage portion 81 of the oil passage 31c of the hydraulic speed controller TV-HSC. The throttle valve 92 is operated towards its close side when the fan 3 is required to increase its speed while the oil pump 70 rotates in the normal direction A. On the other hand, the throttle valve 92 is operated towards its open side when the fan 3 is required to increase its speed while the oil pump 70 rotates in the reversed direction B. More specifically, as the throttle valve 92 is operated towards the close side while when the oil pump 70 rotates in the normal direction A, the oil pump 5 is subjected to a gradually increasing rotational resistance as the planetary gear mechanism 4 gradually reduces its speed ratio, so that the fan 3 gradually increases its speed. When the throttle valve 92 is fully closed so as to stop the oil pump 5, the fan 3 speeds up to its maximum speed.

If a demand for further speeding up the fan 3 beyond the maximum speed occurs, the directional control valve 91 is switched to the reverse valve position 91B so as to cause the oil pump 70 to rotate in the reversed direction B. Simultaneously with the switch-over of the directional control valve 91, the throttle valve 92 is operated gradually towards the open side. With opening of the throttle valve, the fan 3 increases its speed beyond the maximum speed and reaches the over-maximum highest fan speed when the throttle valve 92 is fully opened.

Figure 13:
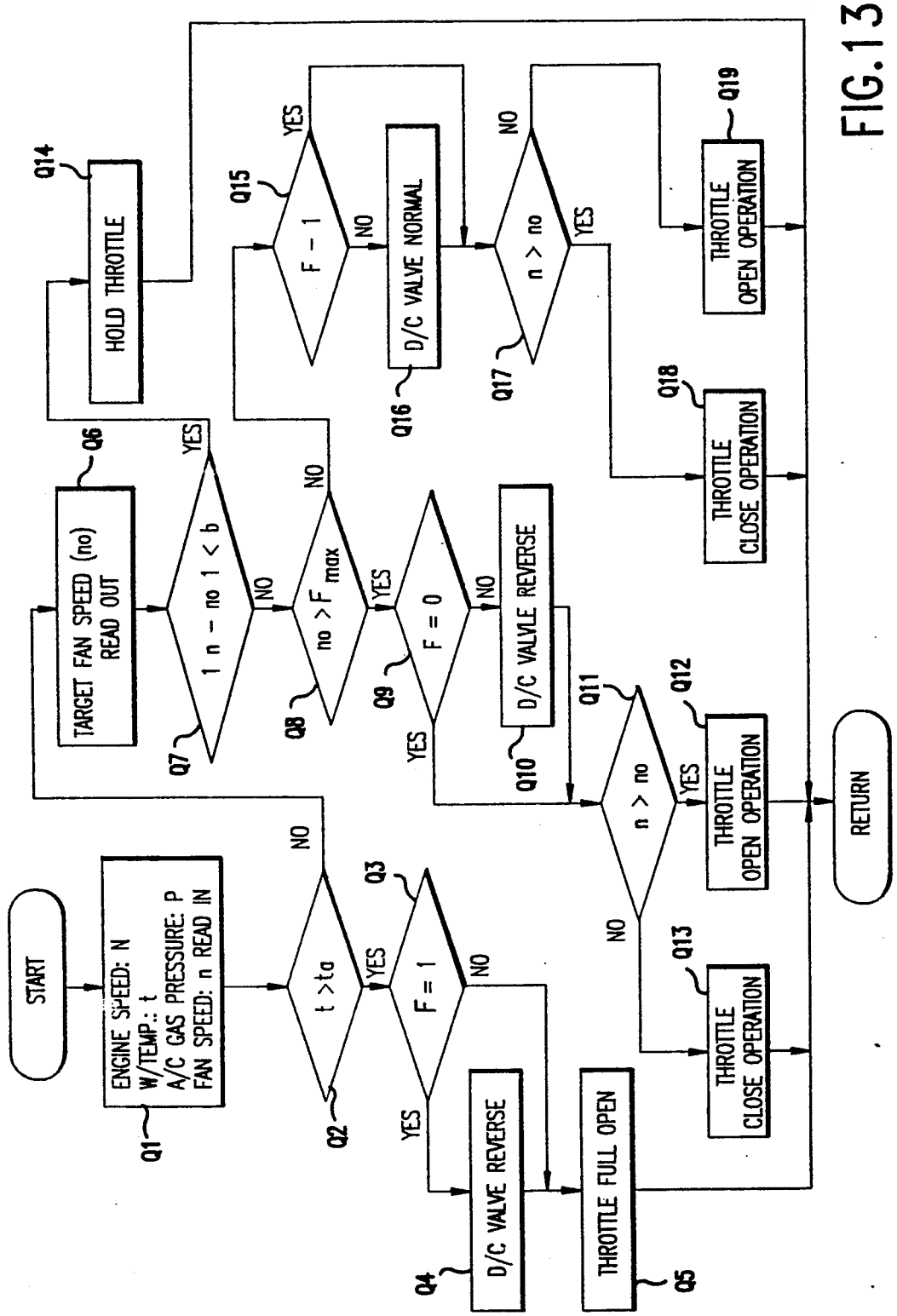
FIG. 13 is a flow chart showing a fan speed control sequence for the microcomputer of the electronic control unit used with the fan speed control system of FIG. 12.

The operation of the fan speed control system depicted in FIG. 12 is best understood by reviewing FIG. 13, which is a flow chart illustrating a fan speed control routine for the microcomputer of the electronic control unit (ECU) 10.

Referring to FIG. 13, immediately after starting the fan speed control routine, a present engine operating condition, represented by an engine speed an engine cooling water temperature t, an air conditioner gas pressure P, and a fan speed n, are read in at step Q1. Then, a decision is made at step Q2 as to whether or not the engine cooling water temperature t is higher than an allowable water temperature ta, which is predetermined for the engine speed N and read out from the allowable water temperature map. If the answer to the decision is "YES," this indicates that the engine EN must be cooled quickly for protection. Accordingly, the oil pump 5 must be subjected to the maximum rotational resistance so as to force the fan 3 to operate at its maximum speed. That is, a decision is made at step Q3 as to whether or not a valve direction flag F has been set to a state of "1" which indicates that the directional control valve 91 is in the normal valve position 91A for allowing the oil pump 70 to operate in the normal direction. It is to be noted that the valve direction flag F set to a state of "0" indicates that the directional control valve 91 is in the reverse valve position 91B for allowing the oil pump 70 to operate in the reversed direction. After switching the directional control valve 91 to the reverse valve position 91B at step Q4 if the answer to the decision is "YES" or directly if the answer to the decision is "NO," the throttle valve 92 is fully closed at step Q5. As a result of fully closing the throttle valve 92 while causing the reversible oil pump 70 to rotate in the reversed direction, the carrier 44 of the planetary gear mechanism 4 rotates at the over-maximum highest speed in the reverse direction B, so as to provide the over-minimum lowest speed ratio of the planetary gear mechanism 4. Accordingly, the fan 3 rotates at the over-maximum highest fan speed, so that the engine is quickly cooled.

If the answer to the decision at step Q2 is "NO," this indicates that the engine EN needs an ordinary cooling, i.e., an ordinary fan speed control, according to its operating condition. For the ordinary fan speed control, a target fan speed no for the engine speed N is read out from the target fan speed map at step Q6. Then, at step Q7, the fan speed n and the target fan speed no are compared so as to decide whether a deviation between them is smaller than a predetermined specific value b. As long as the absolute value of the difference is smaller than the specific value b, the fan 3 is judged to be operating at a desirable or normal fan speed. On the other hand, if the absolute value of the difference is larger than the specific value b, the fan is judged to be operating at an undesirable fan speed. Accordingly, if the answer to the decision at step Q7 is "YES," this indicates that the fan 3 is operating at a desirable fan speed, then, the directional control valve 91 and the throttle valve 92 are held on at their present positions so as to keep the present rotation resistance acting on the carrier 44 at step Q14, thereby keeping the fan 3 operating at its present speed.

However, when the answer to the decision at step Q7 is "NO," namely, when the deviation of speeds is greater than or equal to the specific value b, this indicates that increasing or decreasing the fan speed n is needed. If in fact the fan 3 should change the fan speed n, then, a decision is made at step Q8 as to whether the target fan speed no is larger than the maximum speed Fmax which is given while the oil pump 70 rotates in the normal direction A. If the target fan speed no is actually larger than the maximum speed Fmax or the answer to the decision is "YES," this indicates that the oil pump 70 must be reversed in rotational direction. Then, at step Q9, it is judged whether or not the valve direction flag F has been set to the state of "0". After switching the directional control valve 91 to the reverse valve position 91B at step Q10 if the answer to the decision is "NO" or directly if the answer to the decision is "YES," a decision is made at step Q11 as to whether the fan speed n is greater than the target fan speed no. This decision is made to determine whether the throttle valve 92 is opened or closed. If the answer is "YES," or the fan speed n is greater than the target fan speed no, this indicates that the fan 3 is rotating too fast. Then, the throttle valve 92 is operated toward its open side so as to reduce or lower the rotational resistance of the oil pump 5 acting on the carrier 44 at step Q12, thereby causing the fan 3 to drop its speed. On the other hand, if the answer is "NO," or the fan speed n is equal to or lower than the target fan speed no, this indicates that the fan 3 is rotating too slow. Then, the throttle valve 92 is operated toward its close side so as to increase or raise the rotational resistance of the oil pump 5 acting on the carrier 44 at step Q13, thereby causing the fan 3 to elevate its speed.

If the answer to decision at step Q8 is "NO," this indicates that the fan speed n lower than or equal to the maximum fan speed Fmax, this indicates that the fan 3 can be controlled to increase its speed while the oil pump 5 remains in its normal rotational direction. Then, a decision is made at step Q15 as to whether or not a valve direction flag F has been set to the state of "1." After switching the directional control valve 91 to the normal valve position 91B at step Q16 if the answer to the decision is "NO" or directly if the answer to the decision is "YES," a final decision is made at step Q17 as to whether or not the fan speed n is greater than the target fan speed no. If the answer is "YES," or the fan speed n is lower than the target fan speed no, this indicates that the fan 3 is rotating too slow. Then, the throttle valve 92 is operated toward its close side so as to raise the rotational resistance of the oil pump 5 acting on the carrier 44 at step Q18, thereby causing the fan 3 to increase its speed. On the other hand, if the answer is "NO," or the fan speed n is equal to or higher than the target fan speed no, this indicates that the fan 3 is rotating too fast. Then, the throttle valve 92 is operated toward its open side so as to decrease or drop the rotational resistance of the oil pump 5 acting on the carrier 44 at step Q19, thereby causing the fan 3 to decrease its speed. Thus, the fan speed control system suppresses effectively a of the engine output while periodically repeating the fan speed control as well as controlling the fan 3 to operate at any desired speed in accordance with engine cooling demands.

It is to be understood that although the present invention has been described in detail with respect to preferred embodiments thereof, various other embodiments and variations may occur to those skilled in the art. Any such other embodiments and variations which fall within the scope and spirit of the invention and are intended to be covered by the following claims.

What is claimed is:

1. A speed control system for a rotary body of an engine cooling apparatus for blowing air to an engine so as to cool the engine, said speed control system comprising:
   a planetary gear mechanism, having an input gear connected to an engine output of said engine and an output gear driving said rotary body, said planetary gear mechanism establishing a ratio of rotational speed between said input gear and said output gear; and
   hydraulic control means, operationally coupled to said planetary gear mechanism, for varying an operational resistance acting on said planetary gear mechanism so as to cause said planetary gear mechanism to vary said ratio of rotational speeds.

2. A speed control system as recited in claim 1, wherein said planetary gear mechanism has a sun gear, a pinion gear and a ring gear, said input gear comprising one of said sun gear and said pinion gear and said output gear comprising said ring gear, and wherein said hydraulic control means is operationally coupled to the other one of said sun gear and said pinion gear so as to vary a revolution speed or a rotational speed of the other one of said pinion gear and said sun gear.

3. A speed control system as recited in claim 2, wherein said hydraulic control means comprises hydraulically resistance-generating means, operationally coupled to said other one of said sun gear and said pinion gear, for generating operative resistance acting on said other one of said sun gear and said pinion gear and an electrically controlled valve for variably supplying a hydraulic oil to said hydraulically resistance-generating means according to operating conditions of said engine so as to vary said operational resistance, and thereby vary a revolution speed or a rotational speed of said other one of said pinion gear and said sun gear.

4. A speed control system as recited in claim 3, wherein said hydraulically resistance-generating means comprises a hydraulic pump.

5. A speed control system as recited in claim 4, wherein said electrically controlled valve comprises a pressure control valve for variably controlling a pressure difference between hydraulic pressures before and after said hydraulic pump.

6. A speed control system as recited in claim 5, wherein said pressure control valve decreasingly varies said pressure difference with an increase in speed of said engine.

7. A speed control system as recited in claim 3, wherein said hydraulically resistance-generating means compares a hydraulic fluid coupling.

8. A speed control system as recited in claim 7, wherein said electrically controlled valve comprises a volume control valve for variably controlling a volume of a hydraulic oil supplied to said hydraulic fluid coupling.

9. A speed control system as recited in claim 8, wherein sad volume control valve decreasingly varies said volume with an increase in speed of said engine.

10. A speed control system as recited in claim 3, wherein said hydraulic control means includes an engine oil pump for supplying a lubricant oil to said hydraulically resistance-generating means as well as to said engine.

11. A speed control system as recited in claim 3, wherein said hydraulically resistance-generating means and said electrically controlled valve are disposed in a closed loop oil passage.

12. A speed control system as recited in claim 11, and further comprising an oil cooler disposed in said closed loop oil passage between said hydraulically resistance-generating means, and said electrically controlled valve.

13. A speed control system as recited in claim 1, wherein said planetary gear mechanism has a sun gear, a pinion gear and a ring gear, said input gear comprising said pinion gear and said output gear comprising said ring gear, and wherein said hydraulic control means is operationally coupled to said sun gear so as to vary a rotational speed of said sun gear.

14. A speed control system as recited in claim 13, wherein said hydraulic control means comprises hydraulically resistance-generating means, operationally coupled to said sun gear, for generating operative resistance acting on said pinion gear and an electrically controlled valve for variably supplying a hydraulic oil to said hydraulic control means according to operating conditions of said engine so as to vary said operative resistance and thereby vary a rotational speed of said sun gear.

15. A speed control system as recited in claim 14, wherein said hydraulically resistance-generating means comprises a hydraulic pump directly attached to said sun gear.

16. A speed control system as recited in claim 14, wherein said hydraulically resistance-generating means comprises a hydraulic fluid coupling directly attached to said sun gear.

17. A speed control system as recited in claim 1, wherein said planetary gear mechanism has a sun gear, a pinion gear and a ring gear, said input gear comprising said sun gear and said output gear comprising said ring gear, and wherein said hydraulic control means is operationally coupled to said pinion gear so as to vary a revolution speed of said pinion gear around said sun gear.

18. A speed control system as recited in claim 1, wherein said rotary body comprises a fan, having a plurality of fan blades, which is disposed between said engine and a radiator.

19. A speed control system as recited in claim 1, and further comprising clutch means, disposed between said planetary gear mechanism and said hydraulic control means, for disconnecting an operational resistance acting on said planetary gear mechanism from said hydraulic control means when said engine is heated higher than a predetermined engine temperature.

20. A speed control system as recited in claim 19, and further comprising a thermo-switch for unlocking said clutch means so as to disconnect said operational resistance when detecting a predetermined engine coolant temperature representative of said predetermined engine temperature.

21. A speed control system for a rotary fan of an engine cooling apparatus disposed between an engine and a radiator for drawing air through the radiator and blowing it to the engine so as to cool the engine, said speed control system comprising:

planetary gear means, having a pinion gear connected to an engine output of said engine, a ring gear driving said rotary fan and a sun gear formed integrally with a rotary shaft through which said planetary gear means is supported by said engine, for variably establishing a ratio of rotational speeds between said fan and said rotary shaft; and hydraulic control means for applying an operational resistance to said rotary shaft so as to cause said planetary gear means to vary said ratio of rotational speeds, said hydraulic control means including hydraulically resistance-generating means directly coupled to said rotary shaft so as to apply operative resistance to said rotary shaft and an electrically controlled valve for variably supplying a hydraulic oil to said hydraulically resistance-generating means according to operating conditions of sad engine so as to vary said operative resistance and thereby vary rotational speed of said sun gear.

22. A speed control system as recited in claim 21, wherein said hydraulically resistance-generating means comprises a hydraulic pump.

23. A speed control system as recited in claim 22, wherein said electrically controlled valve comprises a pressure control valve for variably controlling a pressure difference between hydraulic pressures before and after said hydraulic pump.

24. A speed control system as recited in claim 23, wherein said pressure control valve decreasingly varies said pressure difference with an increase in speed of said engine.

25. A speed control system as recited in claim 21, wherein said hydraulically resistance-generating means comprises a hydraulic fluid coupling.

26. A speed control system as recited in claim 25, wherein said electrically controlled valve comprises a volume control valve for variably controlling a volume of a hydraulic oil supplied to said hydraulic fluid coupling.

27. A speed control system as recited in claim 26, wherein said volume control valve decreasingly controls varies said volume with an increase in speed of said engine.

28. A speed control system as recited in claim 21, wherein said rotary shaft is formed with an oil passage in communication with said hydraulically resistance-generating means so as to lubricate said planetary gear means.

29. A speed control system as recited in claim 21, wherein said oil passage includes therein an electrically controlled check valve opened every predetermined period of time of operation of said engine.

30. A speed control system as recited in claim 21, wherein said oil passage includes therein an electrically controlled check valve opened every predetermined mileage.

31. A speed control system for a rotary fan of an engine cooling apparatus disposed between an engine and a radiator for drawing air through the radiator and blowing it to the engine so as to cool the engine, said speed control system comprising:

planetary gear means, having a sun gear connected to an engine output of said engine, a ring gear driving said rotary fan, and a pinion gear, for variably establishing a ratio of rotational speeds between said fan and said rotary shaft; and hydraulic control means for applying an operational resistance to said pinion gear so as to cause said planetary gear means to vary said ratio of rotational speeds, said hydraulic control means including a reversible hydraulic pump and electrically controlled valve means for supplying a hydraulic oil, variably in volume and reversibly in direction, to said reversible hydraulic pump according to operating conditions of said engine and so as to vary said operative resistance, thereby varying a rotational speed of said pinion gear.

32. A speed control system as recited in claim 31, wherein said electrically controlled valve means comprises a throttle valve disposed in an oil passage bypassing said reversible hydraulic pump.

33. A speed control system as recited in claim 31, wherein said electrically controlled valve means comprises a directional control valve and a throttle valve.

34. A speed control system for a rotary fan of an engine cooling apparatus for blowing air to an engine so as to cool the engine, said speed control system comprising:

temperature detecting means for detecting a predetermined temperature of said engine;

a planetary gear mechanism, having an input gear connected to an engine output of said engine and an output gear driving said rotary fan, said planetary gear mechanism establishing a ratio of rotational speeds between said input gear and said output gear;

hydraulically resistance-generating means operationally coupled to said planetary gear mechanism for generating and applying an operational resistance to said planetary gear mechanism so as to cause said planetary gear mechanism to vary said ratio of rotational speeds;

hydraulic control means for varying a hydraulic pressure supplied to said hydraulically resistance-generating means to vary said operational resistance according to engine operating conditions; and stopping means for stopping said hydraulically resistance-generating mean when said temperature detecting means detects said predetermined temperature so as to drop said ratio of rotational speeds between said input gear and said output gear.

35. A speed control system as recited in claim 34, wherein said hydraulically resistance-generating means comprises a hydraulic pump.

36. A speed control system as recited in claim 35, wherein said stopping means comprises an electromagnetic clutch disposed between said planetary gear mechanism and said hydraulic pump, said electromagnetic clutch being locked when said temperature detecting means detects said predetermined temperature.

37. A speed control system as recited in claim 36, wherein said hydraulic control means comprises a throttle valve for controlling a pressure difference before and after said hydraulic pump.

38. A fan speed control system as recited in claim 37, wherein said throttle valve changes said pressure difference to a maximum pressure difference when said temperature detecting means detects said predetermined temperature.

39. A speed control system as recited in claim 34, wherein said hydraulically resistance-generating means comprises a hydraulic fluid coupling.

40. A speed control system as recited in claim 39, wherein said stopping means comprises an electromagnetic clutch disposed between said planetary gear mechanism and said hydraulic fluid coupling, said electromagnetic clutch being locked when said temperature detecting means detects said predetermined temperature.

41. A speed control system apparatus according to claim 39, wherein said hydraulic control means comprises a throttle valve for controlling a volume of hydraulic oil introduced into said hydraulic fluid coupling.

42. A fan speed control system as recited in claim 41, wherein said throttle valve changes said volume to a maximum volume when said temperature detecting means detects said predetermined temperature.

* * * * *